United States Patent Office 2,732,370
Patented Jan. 24, 1956

2,732,370

FLUOROCARBON VINYL ETHERS AND POLYMERS

Donald W. Codding, St. Paul, Minn., assignor to Minnesota Mining & Manufacturing Company, St. Paul, Minn., a corporation of Delaware No Drawing. Application May 17, 1952,
Serial No. 288,540

6 Claims. (Cl. 260—91.1)

This invention relates to my discovery of a new and useful class of reactive fluorocarbon compounds and their polymers.

These new compounds are fluorocarbon vinyl ethers, namely, vinyl 1,1-dihydroperfluoroalkyl ethers having from 6 to 14 carbon atoms in the molecule. These compounds have the formula:

$$C_nF_{2n+1}CH_2-O-CH=CH_2$$

where $n$ has an integer value of 3 to 11.

These vinyl ether compounds are clear colorless water-insoluble liquids and contain over 58% by weight of combined fluorine. The first member of the specified series is the vinyl 1,1-dihydroperfluorobutyl ether:

$$CF_3(CF_2)_2CH_2-O-CH=CH_2$$

which may also be termed the 2,2,3,3,4,4,4-heptafluorobutyl vinyl ether. This compound is soluble in hydrocarbons and other common organic solvents, such as benzene, heptane, carbon tetrachloride, diethyl ether, acetone, methyl isobutyl ketone, ethyl acetate and butyl acetate. The higher members of the series show decreasing solubility owing to the increasing number of fluorinated carbon atoms.

These compounds are reactive monomers and can be readily polymerized to yield thermoplastic liquid and solid homopolymers containing over 58% by weight of combined fluorine. Solid rubbery homopolymers can be made. These homopolymers are flame-resistant. They are all insoluble in water and in hydrocarbons and carbon tetrachloride. They are both hydrophobic (water-repellent) and oleophobic (oil-repellent). The homopolymers of the vinyl 1,1-dihydroperfluorobutyl ether are soluble in oxygenated organic solvents, such as diethyl ether, acetone, methyl isobutyl ketone, ethyl acetate and butyl acetate. The polymers of the higher members of the series become increasingly oleophobic and show decreasing solubility in oxygenated solvents.

In these fluorocarbon vinyl ether compounds, the saturated fluorocarbon chain $(C_nF_{2n+1}-)$, consisting solely of at least three fully fluorinated carbon atoms, provides a polycarbon fluorocarbon terminal group at the opposite end of the molecule from the unsaturated terminal ethylenic hydrocarbon group, serving as a saturated fluorocarbon "tail" that imparts novel characteristics due to its unique combination of physical and chemical properties. This fluorocarbon "tail" is non-polar and has a high degree of chemical inertness and thermal stability. It is both hydrophobic and oleophobic, lacking an affinity for either water or hydrocarbons.

The present compounds are thus clearly distinguished from the vinyl 1,1-dihydrotrifluoroethyl ether compound, $CF_3CH_2-O-CH=CH_2$, and its true homologues wherein the incremental unit is a methylene group $(-CH_2-)$, represented (as to normal compounds) by the generic formula:

$$CF_3(CH_2)_m-O-CH=CH_2$$

Such trifluoro vinyl ether compounds, in contradistinction to the present compounds, are structurally characterized by having a terminal trifluoromethyl group $(CF_3-)$ that is linked solely by one or more interposed $-CH_2-$ groups to the oxygen atom. As the number of carbon atoms increases, the length of the linking hydrocarbon chain increases, thus further separating the oxygen atom from the single fluorinated carbon atom, and enhancing the hydrocarbon characteristics of the molecule. All of the trifluoro ethers contain less than 50% by weight of combined fluorine and the percentage decreases with increase in number of carbon atoms.

The effect in my compounds of the fluorocarbon "tail" (containing three or more fluorinated carbon atoms) is such as to produce a difference in kind over the above-mentioned trifluoromethyl compounds. Furthermore, a break in properties occurs even in respect to the 1,1-dihydropentafluoropropyl vinyl ether compound, $$CF_3CF_2CH_2-O-CH=CH_2$$

showing that the distinctive fluorocarbon "tail" effect requires a minimum of three carbon atoms in the fluorocarbon group. Further increase in the length of the fluorocarbon "tail" still further enhances the distinctive fluorocarbon characteristics of the present compounds and their polymers (such as the oil-repellency of the polymers) and increases the percentage of combined fluorine.

The ethylenic bond in the present compounds provides a point of attack for chemical reactions. These compounds are reactive and various derivatives can be made through addition at the double bond. For example, the acetoxy acetal derivatives can be formed by addition of acetic acid, having the formula:

$$C_nF_{2n+1}CH_2-O-CH(CH_3)-O-\underset{\underset{O}{\|}}{C}-CH_3$$

Correspondingly, the trifluoroacetoxy acetal derivatives can be formed by addition of trifluoroacetic acid, having the formula:

$$C_nF_{2n+1}CH_2-O-CH(CH_3)-O-\underset{\underset{O}{\|}}{C}-CF_3$$

The acetal derivatives can be formed by addition of alcohols, including 1,1-dihydroperfluoroalkyl alcohols.

The present vinyl ether compounds polymerize inter se to form novel fluorinated polyvinyl ether homopolymers (polyvinyl 1,1-dihydroperfluoroalkyl ethers) containing a multiplicity of ether units which each have a terminal fluorocarbon side chain containing from 3 to 11 carbon atoms, as indicated by the following formula which shows one of the recurring polymer units:

$$\begin{array}{c} | \\ HCH \\ | \\ HC-O-CH_2(C_nF_{2n+1}) \\ | \end{array}$$

These polymers have a molecular structure comprising a skeletal linear hydrocarbon chain to which a multiplicity of saturated fluorocarbon side chains containing at least three carbon atoms are linked by means of methylenoxy groups $(-O-CH_2-)$.

The homopolymers of the ethers that contain 3 to 5 carbon atoms in the fluorocarbon chain (6 to 8 carbon atoms in the molecule) are of particular interest. The solid high-polymers are rubbery. The intermediate polymers are clear, viscid, sticky materials. The polymers of higher members of the ether series (for instance, vinyl 1,1-dihydroperfluorodecyl ether) are plastic or oily when liquid and are wax-like when solid. The rubbery polymers are tacky in the pure state if the surface is not contaminated. They have value in making adhesives. The degree of tackiness can be increased by compounding with a compatible tackifier material, such as a sticky viscous intermediate polymer. The rubbery polymers can also be used to provide flame-resistant coatings and in making gaskets, that are highly resistant to water, oils, and greases. The wax-like polymers can be used in treating paper and textile materials to render them waterproof and oilproof and to impart fire-resistance.

Copolymers formed from mixtures of two or more different fluorocarbon vinyl ether monomers can be made, in which case each polymer molecule will have side chains of different lengths.

Novel copolymers (heteropolymers) can be made by polymerizing a mixture of these novel vinyl ether monomers and polymerizable monomers of other kinds which contain an ethylenic linkage. Examples of the latter are acrylonitrile, vinyl acetate, styrene, methyl acrylate, methyl methacrylate, isoprene and butadiene; both as to non-halogenated and halogenated varieties. Fluorocarbon vinyl esters and acrylates can be used as comonomers. Vulcanizable heteropolymers can be made. The side chains can vary as to length and as to chemical type. This makes possible the production of many types of polymers having different physical properties.

Bulk, solution, emulsion and granular polymerization procedures can be utilized. The peroxide catalysts (such as acetyl peroxide, benzoyl peroxide and cumene hydro-peroxide) can be employed, as also boron trifluoride. Polymerization occurs at normal pressures and moderate temperatures. Use can be made of ultra-violet light for promoting polymerization.

The properties of the polymer masses can also be varied by the use of plasticizers, and by compounding with carbon black and other finely divided solid materials such as zinc oxide. The stiffness or hardness of the polymer mass can be increased by including a small proportion of a polyfunctional compound at the time of polymerization to cause cross-linking between the skeletal chains and thereby form a three-dimensional network. The use of various expedients for modifying the properties of polymer masses is understood by those skilled in polymer chemistry and need not be elaborated upon.

The fundamental contribution of the present invention is the discovery of the aforesaid novel fluorocarbon vinyl ether compounds and of their utility as polymerizable monomers for making a wide variety of homopolymers and of heteropolymers.

I have discovered that the 1,1-dihydroperfluoroalkyl vinyl ethers of this invention $C_nF_{2n+1}CH_2OCH=CH_2$, can be made from the corresponding 1,1-dihydroperfluoroalkyl alcohols, $C_nF_{2n+1}CH_2OH$, by reacting with vinyl acetate, $CH_3COOCH=CH_2$, in the presence of a mercuric catalyst (such as mercuric sulfate) and a polymerization inhibitor (such as hydroquinone). These fluorocarbon alcohol starting compounds are described and claimed in the copending application of D. R. Husted and A. H. Ahlbrecht, S. N. 164,611, filed on May 26, 1950; since issued as Patent No. 2,666,797 on Jan. 19, 1954.

The following table lists the approximate boiling points (at 740 mm.) of the normal 1,1-dihydroperfluoroalkyl alcohols which have from 3 to 11 carbon atoms in the fluorocarbon chain.

| Compounds: | B. P. (° C.) |
|---|---|
| $C_3F_7CH_2OH$ | 95 |
| $C_4F_9CH_2OH$ | 111 |
| $C_5F_{11}CH_2OH$ | 128 |
| $C_6F_{13}CH_2OH$ | 144 |
| $C_7F_{15}CH_2OH$ | 160 |
| $C_8F_{17}CH_2OH$ | 176 |
| $C_9F_{19}CH_2OH$ | 192 |
| $C_{10}F_{21}CH_2OH$ | 208 |
| $C_{11}F_{23}CH_2OH$ | 224 |

The lower alcohols of the above series are liquid at room temperature but higher members are solids. Thus $n$-$C_9F_{19}CH_2OH$ has a melting point of about 87° C. There are several processes of making these alcohols. They can be prepared by the reduction of the fluorocarbon monocarboxylic acids which have a corresponding fluorocarbon chain ($C_nF_{2n+1}COOH$), using lithium aluminum hydride ($LiAlH_4$) as the reduction agent in an anhydrous ether vehicle. Instead of using the fluorocarbon acids, use can be made of the corresponding acid chlorides ($C_nF_{2n+1}COCl$), as starting compounds for reduction to the desired alcohols. The alcohols can also be prepared by catalytic hydrogenation of the corresponding methyl esters of fluorocarbon acids ($C_nF_{2n+1}COOCH_3$), using a copper chromium oxide catalyst containing a trace of barium, at elevated temperatures and high pressures (in general at least about 200° C. and 1,500 lbs./sq. in.). Fluorocarbon acids and derivatives are described and claimed in the patent of A. R. Diesslin, E. A. Kauck and J. H. Simons, No. 2,567,011 (September 4, 1951). See, also, the paper of Kauck and Diesslin published in the October 1951 issue of Industrial and Engineering Chemistry (vol. 43, pp. 2332–34).

*Example 1*

This example provides a detailed illustration of the general procedure previously described and relates specifically to the production of the vinyl 1,1-dihydroperfluorobutyl ether:

$$CF_3(CF_2)_2CH_2-O-CH=CH_2$$

and polymers made therefrom. It will also serve as a guide to the making of other ethers and polymers of the present invention.

The reaction vessel was a 3-neck 1000 ml. glass flask equipped with a stirrer, thermometer, and water-cooled reflux condenser fitted with a calcium chloride drying tube. The flask was cooled by means of an ice bath.

The flask was charged with 250 grams (1.25 moles) of 1,1-dihydroperfluorobutyl alcohol $$CF_3(CF_2)_2CH_2OH$$

646 grams (7.50 moles) of vinyl acetate $$CH_3COOCH=CH_2$$

and a trace of hydroquinone (serving as a polymerization inhibitor); and after these had been mixed and cooled, addition was made of 2.7 grams of mercuric acetate and 0.4 gram of sulfuric acid, to provide 0.3% by weight of mercuric sulfate formed in situ, serving as the catalyst. The reaction started immediately and rapidly upon formation of the catalyst and proceeded to 45% conversion in 30 minutes. The reaction temperature dropped from 5° C. to 0° C. during this period, the flask being cooled by the ice bath, thus showing that the reaction is not appreciably exothermic. By the end of 2 hours a 60% conversion had taken place. At the end of 5 hours there had been a 70% conversion. The formation of byproduct (acetoxy acetal) became considerable at this stage so that it was deemed advisable to stop the reaction, which was accomplished by adding 6.3 grams of sodium acetate. (The above data on the course of the reaction (conversion values) were obtained by titrating an aliquot of the reaction solution with 0.1 N sodium hydroxide solution in the presence of ice, so as to determine the amount of acetic acid formed.)

The reaction mixture was washed by being poured into 1.06 liters of a 10% solution of sodium carbonate in ice water; the resultant mixture was shaken well and then allowed to stand. The organic layer was separated and washed with 250 ml. of a 4% solution of sodium carbonate in ice water. The organic layer was separated and dried with 30 grams of anhydrous sodium carbonate, and then treated with a mixture of 10 grams of anhydrous sodium sulfate and 20 grams of anhydrous sodium carbonate. Distillation was effected in a 15 plate fractionation column operated at reduced pressure and afforded three principal fractions: (1) A fraction consisting of six successive cuts containing unreacted vinyl acetate and increasingly enriched with the desired fluorocarbon vinyl ether reaction product; this total fraction having a boiling range of 25–32° C. at 140 mm. pressure, and the refractive index range being 1.3959–1.3690 measured at 20° C. (2) A fraction consisting of the unreacted starting alcohol, having a boiling point of 59° C. at 140 mm. and 42° C. at 50 mm. (3) A by-product fraction having a boiling point of 79–80° C. at 50 mm. This last fraction is an addition product of the fluorocarbon vinyl ether and acetic acid (as shown by the fact that the amount of acetic acid was found to be decreasing in the original reaction mixture at the time the reaction was stopped), namely, the acetoxy acetal compound:

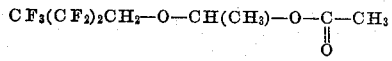

$$CF_3(CF_2)_2CH_2-O-CH(CH_3)-O-\underset{\underset{O}{\|}}{C}-CH_3$$

The saponification equivalent was found to be 271 as compared to the calculated value of 286.

The first fraction, weighing 540 grams, was treated by slowly adding 2 liters of a 10% solution of sodium hydroxide at 10 to 20° C. during a period of 4 hours; then the temperature of the mixture was permitted to rise to room temperature; the total reaction period being 6¾ hours. The purpose of this treatment was to effect hydrolysis of the vinyl acetate so as to facilitate recovery of the fluorocarbon vinyl ether product.

Following a rapid vacuum distillation, fractional distillation in a 6 plate column gave a 32% yield of substantially pure vinyl 1,1-dihydroperfluorobutyl ether. Analysis showed 31.5% C and 58.4% F, as compared to the calculated values of 31.9% C and 58.8% F, respectively. The refractive index at 20° C. was 1.3100. The boiling point was 36° C. at 140 mm.

The polymerization characteristic of this vinyl ether product was demonstrated by placing 0.45 gram thereof and 0.005 gram of a 2% solution of boron trifluoride/ethyl ether complex in diethyl ether solvent, in a glass ampoule which was sealed with a rubber stopper and allowed to stand for 24 hours at 25° C. The polymerization product was a viscous oil which was so highly non-volatile that it did not distill under an oil-pump vacuum.

In other experiments, using the BF₃:diethyl ether complex as catalyst in proportions ranging from 1 to 5%, polymerization at room temperature (25° C.) took place to produce, in periods ranging from 48 hours to one week (depending on the catalyst concentration), a solid rubbery high-polymer.

In other experiments, benzoyl peroxide was used as the catalyst in concentrations of 1 to 10%, at a temperature of about 50° C., to produce in one week clear liquid polymers that were viscid and very tacky. The corresponding reaction time was shortened to one day by using ultra-violet light in addition to the catalyst. It was also found that ultra-violet light alone (without catalyst) promoted the polymerization reaction so as to produce clear, viscid, sticky polymers in 72 hours at about 50° C.

It is especially to be noted that both free radical and acid catalysts are effective; and that the solid homopolymers are rubbery.

*Example 2*

This example illustrates a modified procedure used in making the vinyl 1,1-dihydroperfluorohexyl ether:

$$CF_3(CF_2)_4CH_2-O-CH=CH_2$$

Using the same apparatus, the flask was charged with a mixture of 113.0 grams (0.3766 mole) of pure dry 1,1-dihydroperfluorohexyl alcohol, CF₃(CF₂)₄CH₂OH, 194.5 grams (2.259 moles) of pure dry vinyl acetate, and 0.4 gram of hydroquinone, and the mixture was cooled to 1° C. by means of the ice bath. A mercuric sulfate catalyst was then added (formed by reacting in situ 0.92 gram of mercuric acetate and 0.14 gram of sulfuric acid). The progress of the reaction was followed by titrating an aliquot of the reaction solution with 0.1-N sodium hydroxide solution in the presence of ice; the first measurement being at the end of 2 minutes and thereafter at 30 minute intervals. The reaction was stopped at the end of 3⅓ hours by the addition of 1.9 grams of sodium acetate.

The reaction mixture was washed with 400 ml. of ice water containing 40 grams of sodium carbonate and the organic layer was separated and washed with 80 ml. of ice water containing 4 grams of sodium carbonate. The organic layer was separated and dried with 30 grams of anhydrous sodium sulfate, and then treated with a mixture of 10 grams of anhydrous sodium sulfate and 20 grams of anhydrous sodium carbonate. The aqueous layers in each case were extracted with ether, and the solid residues were rinsed with ether.

The hydrolysis step of the preceding example was omitted. Isolation of the desired vinyl ether product was accomplished by careful fractionation, using a 45 plate column, resulting in a 47.4 gram fraction of pure 1,1-dihydroperfluorohexyl vinyl ether, having a boiling point of 52° C. at 50 mm. and 72° C. at 125 mm., and a refractive index at 20° C. of 1.3118. Analysis showed 29.1% C and 64.3% F, in good agreement with the values calculated from the formula (29.4% C and 64.1% F).

From the forerun, ether rinses and extracts, an additional 11.0 grams of this vinyl ether product were obtained, bringing the total yield to 47.6% based on the alcohol starting compound. The percent conversion measured by the titrations was 70.1%. About 15% (17.3 grams) of the unreacted alcohol was isolated, and 20 grams of mixed high-boiling by-products (B. P. 54° C./20 mm. to 91° C./9 mm.) which presumably were the acetal and acetoxy acetal compounds.

This vinyl ether was also shown to be polymerizable. Using the BF₃:diethyl ether complex as catalyst in proportions ranging from 1 to 5%, viscid liquid polymers were formed within 24 hours at room temperature.

I claim:

1. As new compositions of matter, vinyl 1,1-dihydroperfluoroalkyl ethers having from 6 to 14 carbon atoms in the molecule, represented by the formula:

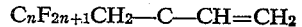

$$C_nF_{2n+1}CH_2-O-CH=CH_2$$

2. As new compositions of matter, vinyl 1,1-dihydroperfluoroalkyl ethers having from 6 to 8 carbon atoms in the molecule, represented by the formula:

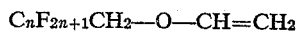

$$C_nF_{2n+1}CH_2-O-CH=CH_2$$

3. Polymers having a skeletal chain containing fluorinated vinyl ether units indicated by the formula:

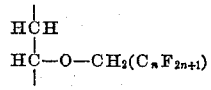

$$\begin{array}{c} | \\ HCH \\ | \\ HC-O-CH_2(C_nF_{2n+1}) \\ | \end{array}$$

where *n* has an integer value of 3 to 11.

4. Sticky liquid polymers having a skeletal chain containing fluorinated vinyl ether units indicated by the formula:

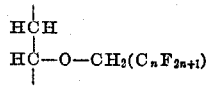

$$\begin{array}{c} | \\ HCH \\ | \\ HC-O-CH_2(C_nF_{2n+1}) \\ | \end{array}$$

where *n* has an integer value of 3 to 5.

5. Solid rubbery polymers having a skeletal chain containing fluorinated vinyl ether units indicated by the formula:

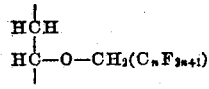
where *n* has an integer value of 3 to 5.
6. 2,2,3,3,4,4,4-heptafluorobutyl vinyl ether.
References Cited in the file of this patent
UNITED STATES PATENTS
| | | |
|---|---|---|
| 2,061,934 | Mueller-Cunradi | Nov. 24, 1936 |
| 2,104,002 | Reppe et al. | Dec. 28, 1937 |